Jan. 4, 1966   W. K. GAUTHIER   3,227,156
ABDOMINAL RETRACTOR DEVICE
Filed Dec. 4, 1962   3 Sheets-Sheet 1
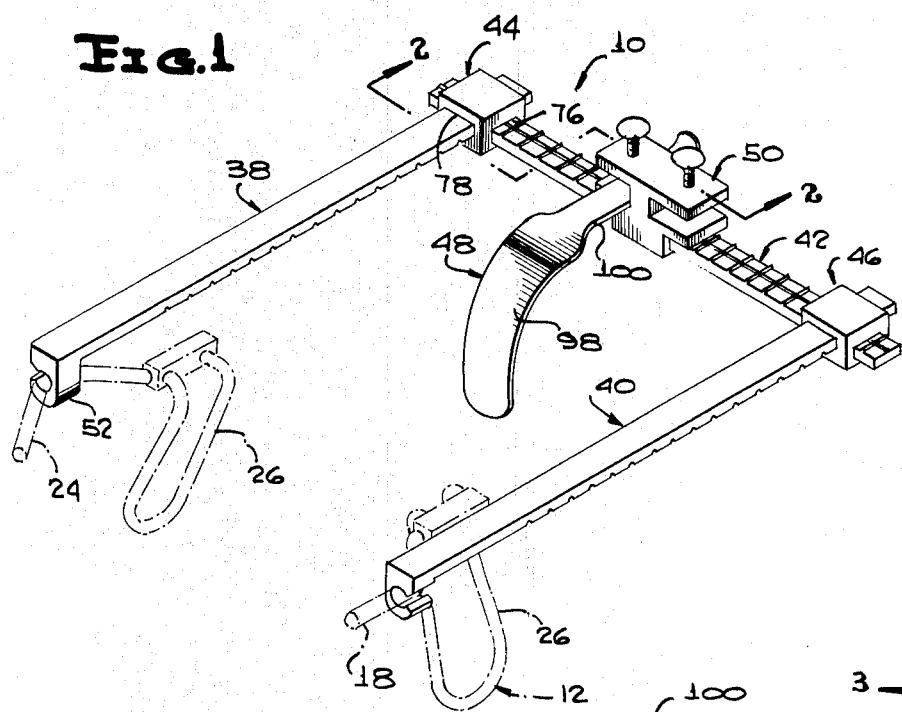
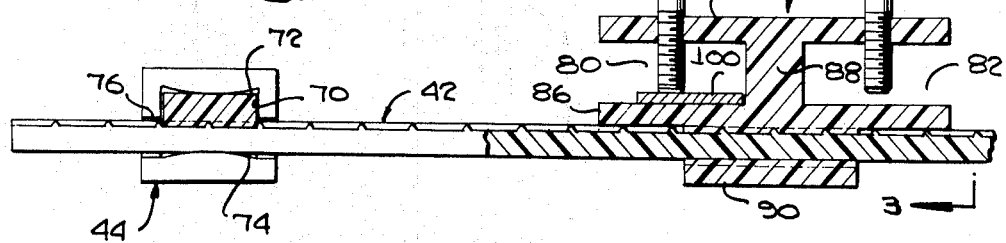
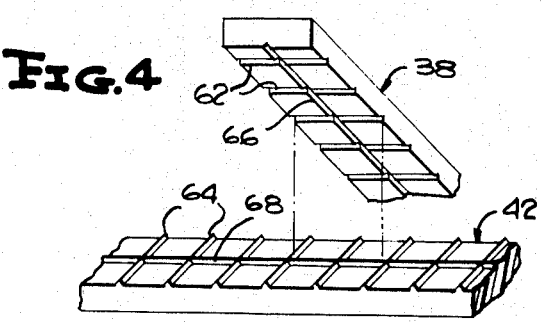
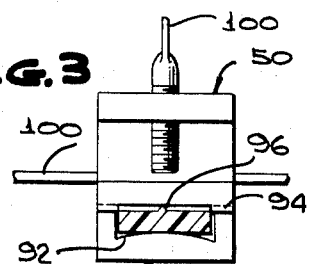
INVENTOR
WILLIAM K. GAUTHIER
BY Shoemaker and Mattare
ATTORNEYS

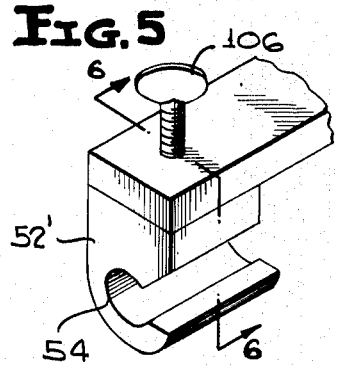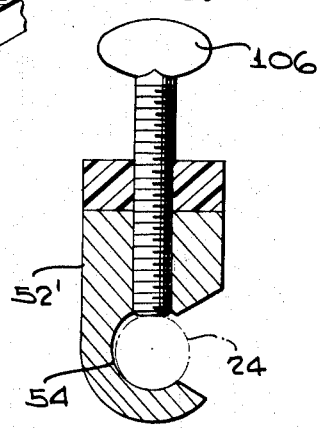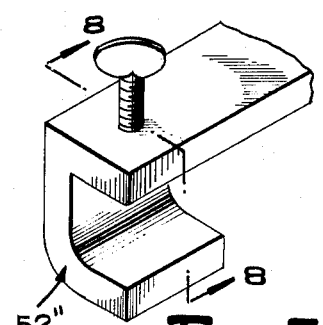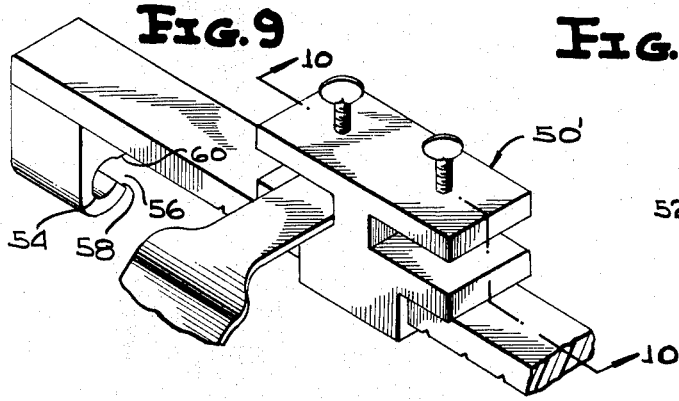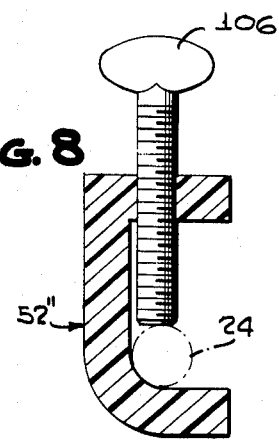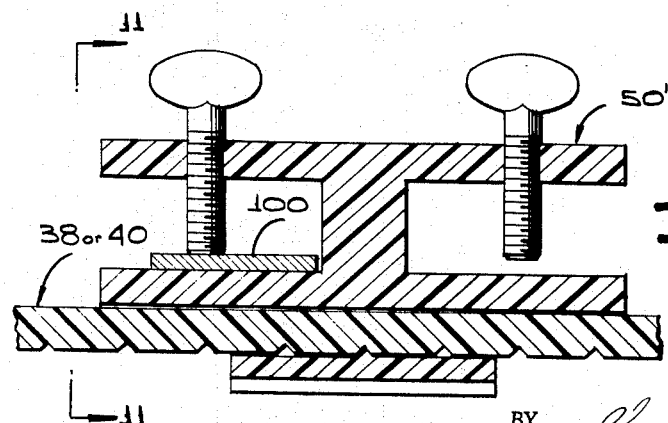

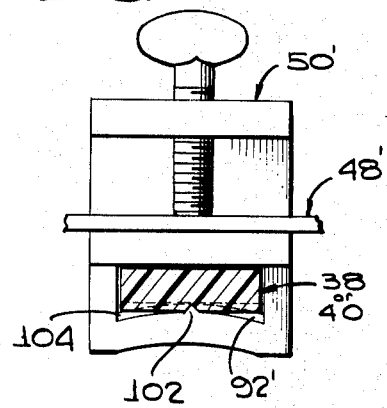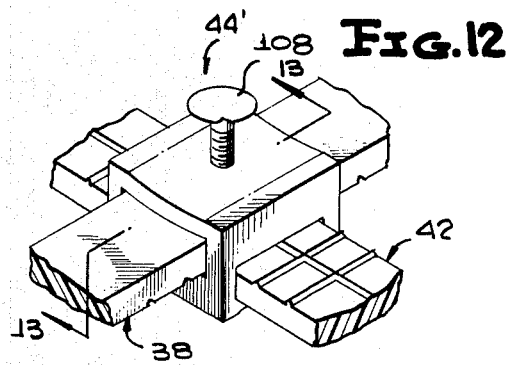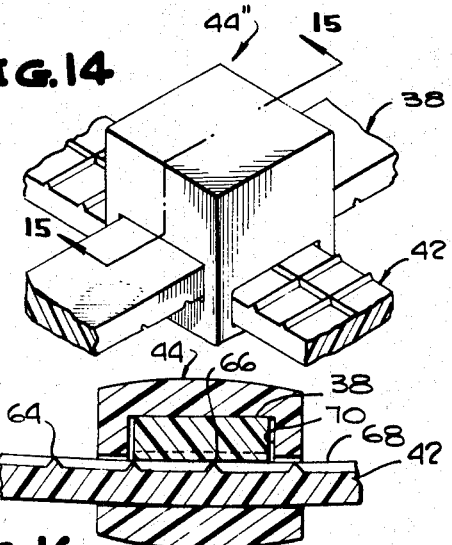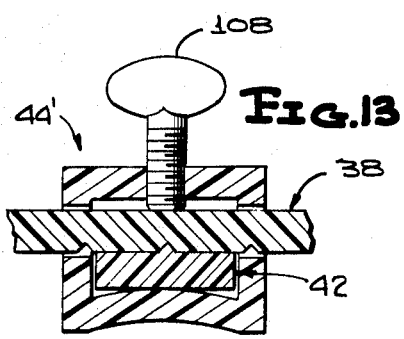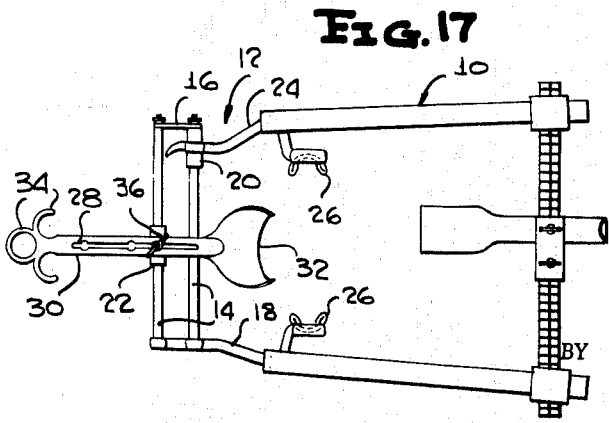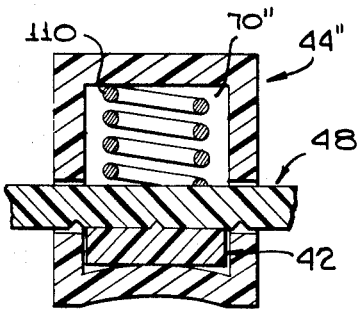

United States Patent Office 3,227,156
Patented Jan. 4, 1966

3,227,156
ABDOMINAL RETRACTOR DEVICE
William K. Gauthier, 310 Codifer Blvd., Metairie, La.
Filed Dec. 4, 1962, Ser. No. 242,241
10 Claims. (Cl. 128—20)

This invention relates to surgical appliances, and more particularly to an abdominal retractor and attachment means therefor.

This invention is an improvement over the invention disclosed in my copending application Ser. No. 161,634 filed Dec. 22, 1961, now U.S. Patent No. 3,168,093.

It is an object of the present invention to provide an abdominal retractor that may be readily used to produce traction in any particular direction and so that the retractor will properly retain the engaged tissues surrounding an incision during the performance of surgery on a patient.

It is another object of the present invention to provide a retractor attachment that may be readily used with conventional and standard retractors in present day use, such as devices commonly known in the art as Balfours or Balfour retractors.

It is another object of the present invention to provide a retractor attachment for use with retractor devices commonly used in surgery that may be readily used with a standard retractor blade commonly known as a Deaver.

It is another object of the present invention to provide a retractor attachment for well known retractors for properly retaining in a spread-apart position the portions of the body surrounding an incision to permit surgery to be performed while eliminating the necessity for maintaining access to the incision by having a person manually hold or spread the portion of the incision upon which it is necessary to operate.

It is another object of the present invention to provide novel retractor attachments for use with present day surgical instruments for maintaining an incision open so that the surgeon has access thereto, which devices may be interchangeable with one another and used with well known surgical devices now in use.

It is still another object of the invention to provide a retractor attachment that may be readily attached to and detached from a retractor and which will give an equal or balanced traction force around all portions of the incision.

It is yet another object of the present invention to provide retractor attachments that may be detachably connected to a retractor at different positions thereon.

It is still another object of the invention to provide a retractor attachment that may be used by itself as a retractor, or in combination with a standard retractor.

It is still yet another object of the present invention to provide novel retractor attachments that may be readily adjusted to produce traction in any particular desired direction, and which can be readily adjusted to attain these results around an incision whether the incision be small or large.

It is still another object of the invention to provide novel retractor attachments in which the parts are interchangeable with one another, which is of simple design and of economical construction, is of light weight, and is durable and reliable in use.

It is yet another object of the invention to provide a surgical retractor which is composed of plastic thereby making the retractor light in weight, economical to construct and easy to clean and sterilize.

It is another object of the invention to provide a Deaver retractor having clamps thereon composed of resilient material thereby permitting the Deaver retractor to be easily and quickly connected to and disconnected from the arms of a Balfour retractor.

It is yet another object of the invention to provide a Deaver retractor including improved and novel means for adjustably connecting the various parts thereof together. More specifically, the mating parts of the retractor are provided with a plurality of mating recesses and ridges which normally secure the parts together but also permit the parts to be moved adjustably relative to one another so as to adjust various parts of the retractor to incisions of different sizes and shapes.

The invention disclosed in this application is an improvement over the invention disclosed in my above mentioned copending application.

The invention will be best understood from a consideration of the following detailed description taken in connection with the accompanying drawings, wherein:

FIG. 1 is a perspective view of my improved Deaver retractor;

FIG. 2 is an enlarged vertical cross sectional view taken substantially on the plane of the line 2—2 in FIG. 1;

FIG. 3 is a vertical cross sectional view taken substantially on the plane of line 3—3 of FIG. 2;

FIG. 4 is an exploded perspective view of a portion of the invention;

FIG. 5 is a perspective view of a modified form of arm clamp;

FIG. 6 is an enlarged vertical cross sectional view taken substantially on the plane of line 6—6 of FIG. 5;

FIG. 7 is a perspective view of another modified form of arm clamp;

FIG. 8 is an enlarged cross sectional view taken substantially on the plane of line 8—8 of FIG. 7;

FIG. 9 is a perspective view showing an alternative arrangement of parts of my invention;

FIG. 10 is an enlarged cross sectional view taken substantially on the plane of line 10—10 of FIG. 9;

FIG. 11 is a vertical cross sectional view taken substantially on the plane of line 11—11 of FIG. 10;

FIG. 12 is a perspective view showing a modified form of connector sleeve;

FIG. 13 is a vertical cross sectional view taken substantially on the plane of line 13—13 of FIG. 12;

FIG. 14 is a perspective view showing another modified form of connector sleeve;

FIG. 15 is a vertical cross sectional view taken substantially on the plane of line 15—15 of FIG. 14;

FIG. 16 is a vertical cross sectional view taken through the connector sleeve of FIG. 1 showing how the retractor device is adjustable;

FIG. 17 is a plan view showing my improved Deaver retractor connected to a Balfour retractor.

As shown in FIG. 17, my improved Deaver retractor 10 is connected to a conventional Balfour retractor 12. The Balfour retractor 12 includes two parallel cross bars 14 rigidly connected together at their ends by a strut 16 and the end portion of an arm 18. The cross bars 14 are preferably of rectangular cross section and slidably receive sleeves 20 and 22 having rectangular passages therethrough.

A movable arm 24 has one of its ends connected to the slottable sleeve 20 and the remainder of the arm extends generally normal to the bars 14 in parallel and opposing relationship to the arm 18. Generally oval shaped retractor blades or hooks 26 are connected to the free ends of the arms 18 and 24 and extend downwardly therefrom.

The center of the sleeve 22 has a threaded stud secured to its center and projecting upwardly therefrom through a slot 28 formed in a bar 30.

A concave retractor blade 32 is connected to one end of bar 30 and extends downwardly therefrom, and finger grips 34 are integrally formed on the other end of bar 30. A wing nut 36 is threaded on the stud extending through slot 28 and adjustably secures rod 30 to sleeve 22. The arms 18 and 24 are preferably of circular or oval cross section.

As shown in FIGS. 1 and 17, my improved Deaver retractor 10 includes a pair of generally parallel side arms 38 and 40, a cross bar 42, a pair of connector sleeves 44 and 46 which slidably and adjustably connect the side arm to the cross bar, a Deaver retractor blade 48 and a blade clamp 50 which adjustably connects the blade 48 to the cross bar 42.

Preferably, the parts of my Deaver retractor are composed of a plastic having some degree of flexibility and highly resilient, such as nylon, for example.

The side arms 38 and 40 are of the same design and shape, and are mirror images of one another. Each arm comprises an elongated bar of rectangular cross section having integrally formed on one end thereof or secured to one end thereof, an arm clamp 52 of C-shaped cross section. As shown in FIGS. 1 and 9, each arm clamp 52 has a longitudinal bore 54 extending therethrough. A longitudinal slot 56 extends through one side of each C-clamp and is defined by radially inwardly converging surfaces 58 and 60. The minimum width of the slot 56 is slightly less than the diameter of the bore 54. Also, the bore 54 has a diameter which is slightly smaller than the diameter of the movable arms 24 of the Balfour retractor whereby the arms 18 and 24 of the Balfour retractor may be forced through the slot 56 into bore 54 whereby the arm clamps 52 due to their resiliency snugly grip the arms 18 and 24.

Each arm 38 and 40 and cross bar 42 is provided with a plurality of mating recesses and embossments. As illustrated in the drawings and particularly in FIG. 4, each of the side arms is provided with a plurality of parallel spaced V-shaped grooves 62 and the cross bar 42 is provided with a plurality of spaced parallel ribs 64. The grooves 62 and the ribs 64 extend transversely and laterally across adjacent surfaces on the side arms and cross bar. Each side arm is also provided with a central longitudinally extending groove 66 which extends normal to and intersects the centers of the grooves 62.

In a similar manner, the cross bar 42 is provided with a central longitudinally extending rib 68 which extends normal to and intersects the ribs 64.

Each of the connector sleeves 44 and 46 are identical to one another and comprise a rectangular block of plastic having a substantially rectangular chamber 70 formed therein. Chamber 70 has four vertically extending side and rear walls. However, the top and bottom walls of chamber 70 preferably have convex surfaces as shown at 72 and 74 in FIG. 2. The side walls of each connector sleeve have rectangular passages 76 aligned with one another extending therethrough into the chamber 70 at the bottom half thereof. The passages 76 are of the same cross sectional shape as cross bar 42 but are slightly larger than the cross sectional dimensions of the cross bar.

Each connector sleeve also has aligned rectangular passages 78 extending through the upper portions of the front and rear walls thereof adapted to slidably receive the side arms 38 and 40. As shown in FIGS. 1 and 2, the bottom portions or bottom edges of the side passages 76 are in alignment with the lower convex surfaces 74 and the upper edges of the passages 78 are in alignment with the upper convex surface 72.

To connect the side arm 38 to the cross bar 42, one end of the cross bar is inserted through the passages 76 with the ribs 64 and 68 projecting upwardly. The forward end of arm 38 remote from the clamp 52 is then inserted through the upper aligned passages 78 with the grooves 62 and 66 facing downwardly. As the arm 38 is forced into chamber 72, longitudinal grooves 66 receives one of the lateral ribs 64 and as the lateral grooves 62 pass over longitudinal rib 68, arm 38 and cross bar 42 are cammed apart against the convex surfaces 72 and 74 so as to expand the upper and lower walls of the connector sleeve 44. After arm 38 has been inserted the proper distance within the sleeve 44, one of the lateral V-shaped grooves 62 receives a portion of longitudinal rib 68 and longitudinal groove 66 receives one of the lateral ribs 64 on the cross bar. Since the minimum distance or the distance between the centers of the convex surfaces 72 and 74 are normally less than the combined thicknesses of the cross bar 42 and one of the arms 38 when their ribs and recesses are mating, the inherent resiliency of the connector sleeve 44 resiliently urges the cross bar and side arm tightly into engagement with one another and the interlocking relationship between the ribs and grooves tends to prevent relative movement between the cross bar and side arm.

In a similar manner the side arm 40 is connected to the other end of cross bar 42 by means of connector sleeve 46. Of course, when sufficient longitudinal force is applied to either of the cross arms or the cross bar, the cross arms and cross bar are cammed apart by the V-shaped ribs and recesses so as to permit relative sliding movement and adjustment between the side arms and cross bar.

The blade clamp 50 comprises a rectangular block having a rectangular recess 80 and 82 formed in each end thereof and causing the blade clamp to be H-shaped in cross section as shown in FIG. 2. The recesses 80 and 82 divide the blade clamp 50 into an upper wall 84, a bottom wall 86, and a central connecting partition 88.

The bottom of the clamp 50 is provided with an integral rectangular lug 90 having a generally rectangular passage 92 extending therethrough and in alignment with the bottom surface of the wall 86. However, as shown in FIG. 3, the bottom surface of passage 92 is of convex shape. The bottom surface of wall 86 and the upper surface of passage 92 are provided with lateral grooves 94 and a longitudinal groove 96 similar to the grooves 62 and 66 for receiving the ribs 64 and 66 of cross bar 42. Thus, when cross bar 42 is inserted through the passage 92, its bottom surface contacts the center of the convex surface of passage 92 whereby the cross bar is urged upwardly into snug frictional engagement with the bottom of wall 86 so that the ribs 64 and 68 of the cross bar are in interlocking engagement with the grooves 94 and 96 in the blade clamp.

The Deaver retractor blade 48 comprises an arcuate plate 98 curved through an angle of approximately 90° and having one end integrally connected to a flat supporting plate 100. The free end of the supporting plate 100 extends through one of the rectangular recesses 80 or 82 and is secured to the clamp 50 by means of one of the thumb screws 100 which are threaded through the upper wall 84 and tightly urge the plate 100 into frictional engagement with the bottom wall 86 as shown in FIG. 2.

The retractor blade 48 may be adjustably connected at any position on the cross bar 42 merely by forcing the clamp 50 longitudinally along the cross bar and allowing selected ones of the ribs 64 to seat within the lateral grooves 94. Of course, while the clamp 50 is being moved, ribs 64 cam the cross bar downwardly against the convex surface in passage 92 and cause the lower wall of lug 90 to deflect downwardly and outwardly. However, since clamp 50 is composed of resilient plastic, the lug 50 always tends to return to its original position thereby urging ribs 64 into grooves 94.

FIGS. 9, 10 and 11 show a modified form of blade clamp 50' which is substantially the same design and shape as the clamp 50 except the grooves 94 and 96 have been omitted, and as shown in FIGS. 10 and 11, the bottom convex surface of passage 92' is provided with a longitudinal rib 102 and a plurality of parallel lateral ribs 104 adapted to extend into and mate with the V-shaped grooves 62 and 66 in the side arms. This permits additional Deaver retractor blades 48' to be adjustably mounted on the side arms 38 and 40. Thus, it is apparent that with retractor blade 48 mounted on cross bar 42 and a retractor blade 48′ adjustably mounted on each of the side arms 38 and 40, the Deaver retractor 10 could be used without the Balfour retractor 12.

In use, the retractor blade 32, 48 and 48′ and the retractor blades 26 are inserted into an incision during surgery to maintain the sides of the incision spread apart and open.

FIGS. 5 and 6 show a modified form 52′ of the arm clamp. The arm clamp 52′ is substantially the same as the arm clamp 52 except a thumb screw is threaded through the arm clamp so as to terminate within the bore 54 and frictionally grip the movable arm 24 of the Balfour retractor to more rigidly secure the Balfour retractor to the Deaver retractor.

FIGS. 7 and 8 show another form of arm clamp 52″ which is similar to the clamp 52′ except the clamp is L-shaped in cross section rather then being of C-shaped cross section. The inside corner of the clamp is formed on a radius of substantially the same radius as the movable arm 24 so as to snugly fit same. A thumb screw 106 is threaded through the end of the side arm so that its lower end engages the upper surface of the movable arm 24 and forces it tightly into the arcuate corner of the arm clamp 52″.

FIGS. 12 and 13 show a modified form of connector sleeve 44′ of substantially the same design as the connector sleeve 44 and connector sleeve 46 except a thumb screw 108 is threaded through the center of the upper wall of the sleeve so as to engage the upper surface of the side arm 38 or 40 so as to urge it into tight engagement with the cross bar 42. Of course, when it is desired to move the side arm relative to the cross bar 42 for adjustment of the Deaver retractor, it is necessary to loosen the thumb screw 108, preform the adjustment and then retighten the thumb screw wtih the grooves and ribs properly mating.

FIGS. 14 and 15 show another form 44″ of a connector sleeve for adjustably connecting the cross bar 42 to one of the side arms 38 or 40. This form of connector sleeve is quite similar to the form shown in FIGS. 1 and 2 except the rectangular chamber 70″ formed in the connector sleeve as well as the connector sleeve itself, is of greater height so as to accommodate a coil spring 110 therein for urging the side arm and cross bar into tight engagement with one another. Thus, when the cross bar and side arm are moved relative to one another within the sleeve 44″, they are cammed apart in a vertical direction by the ribs and recesses thereon so as to compress the spring 110. However, when the cross bar and side arm are released in adjusted position, the spring 110 urges them into tight engagement with one another. Preferably, the upper surface of the chamber 70″ is flat so as to provide a proper seat for the upper end of spring 110.

FIG. 16 illustrates how the connector sleeve 44 permits the cross bar 42 and side arm 38 or 40 to be moved relative to one another. For example, when the cross arm is moved longitudinally through the connector 44, the V-shaped lateral rib 64 reacting against the V-shaped surfaces of groove 66 causes the cross bar and side arm to be cammed vertically apart thereby flexing the arcuate convex inner surfaces of the upper and lower walls of the connector to a flat position. After proper adjustment is made, the inherent flexibility of the upper and lower convex walls of the connector sleeve resiliently urge the ribs 64 and 68 into mating engagement with the V-shaped grooves 62 and 66. FIG. 16 shows the cross bar and side arm cammed apart during adjustment with the convex surfaces of chamber 70 urged to a flat position.

Although I have shown a plurality of mating ribs and recesses for locking the cross bar to the cross arms, it is to be understood that other embossed and indented designs could be used. For example, a plurality of raised cones and conical recesses could be used on the arms and cross bar as well as on blade clamp 50 for adjustably securing the parts together. Also, it is immaterial as to whether the raised embossments are on the cross bar and the recesses are on the side arms or vice versa.

Inasmuch as various changes may be made in the form, location and relative arrangement of the several parts without departing from the essential characteristics of the invention, it will be understood that the invention is not to be limited except by the scope of the appended claims.

I claim:

1. Retractor means for surgical use comprising spaced side arm means, elongated means extending between said side arms, resilient connector means adjustably securing said side arm means to said elongated means, adjacent surfaces of said side arm means and said elongated means being provided with mating embossments and depressions, said embossments and depressions comprising a plurality of parallel grooves, an elongated rib adapted to selectively extend into any one of said grooves, a plurality of parallel ribs generally normal to said elongated rib, an elongated recess adapted to selectively receive any one of said parallel ribs.

2. Retractor means for surgical use comprising spaced side arm means, an elongated member extending between said side arm means, resilient connector means adjustably securing said side arm means to said elongated member, said resilient connector means resiliently urging with a predetermined force said elongated member into frictional engagement with said spaced side arm means, said side arm means and said elongated member being of constant cross section, said resilient connector means comprising a pair of bodies of resilient material, each of said bodies having a pair of crossing passages formed therein, said side arm means extending through one of said passages and said elongated member extending through the other of said passages.

3. Retractor means as defined in claim 2, wherein said connector means is composed of resilient plastic.

4. Retractor means as defined in claim 2, wherein each of said bodies includes a spring urging said elongated member into frictional engagement with said side arm means.

5. Retractor means as defined in claim 2, wherein each of said bodies includes a screw threaded therein, one end of said screw extending into one of said passages.

6. Retractor means for surgical use comprising spaced side arms, connector means extending between one pair of adjacent ends of the side arms, resilient coupling means urging each side arm into frictional engagement with the connector means, a conventional retractor including a pair of rigid arms connected together by means remote from said side arms, a first retractor blade connected to said last-mentioned means and extending downwardly between said rigid arms, releasable means connecting each of said side arms to one each adjacent rigid arm, second and third retractor blades connected to each of said rigid arms in opposing relationship and extending downwardly between said rigid arms, a fourth retractor blade connected to said connector means in opposing relationship to said first retractor blade, said fourth retractor blade extending downwardly between said side arms and being releasably connected to said connector means, said resilient coupling means comprising a sleeve composed of resilient plastic and having criss-crossing passages therethrough telescopically receiving a portion of one of said side arms and said connector means.

7. Retractor means as defined in claim 6, wherein said releasable means comprises C-clamps secured to said side arms and composed of resilient plastic resiliently gripping said rigid arms.

8. Retractor means as defined in claim 7 including a member threaded into each of said C-clamps and engaging one of said rigid arms.

9. Retractor means as defined in claim 6 wherein said releasable means comprises an L-shaped member secured to each side arm, each L-shaped member including a pair of legs at right angles to each other, a member threaded through each side arm and forcing each arm into frictional engagement with one of said legs.

10. Retractor means as defined in claim 9 wherein said side arms and connector means are composed of plastic.

References Cited by the Examiner

UNITED STATES PATENTS

| | | | |
|---|---|---|---|
| 298,791 | 5/1884 | Spooner | 287—51 |
| 503,181 | 8/1893 | Webb | 287—65 |
| 1,238,001 | 8/1917 | Cameron | 128—20 |
| 1,345,012 | 6/1920 | Jones | 287—51 |
| 1,963,173 | 6/1934 | Morin | 128—20 |
| 2,320,709 | 6/1943 | Arnesen | 128—17 |
| 2,642,862 | 6/1953 | Jackson | 128—20 |
| 2,740,404 | 4/1956 | Kohl | 128—215 |
| 2,812,759 | 11/1957 | Taylor | 128—20 |

FOREIGN PATENTS

| | | |
|---|---|---|
| 12,990/28 | 4/1929 | Austria. |
| 824,754 | 11/1937 | France. |
| 547,292 | 3/1932 | Germany. |

RICHARD A. GAUDET, *Primary Examiner.*

JORDAN FRANKLIN, *Examiner.*